United States Patent [19]

Curmi

[11] Patent Number: 4,569,158

[45] Date of Patent: Feb. 11, 1986

[54] SKI SHARPENING TOOL

[76] Inventor: David M. Curmi, 16108 SE. 113th. Pl., Renton, Wash. 98055

[21] Appl. No.: 532,844

[22] Filed: Sep. 16, 1983

[51] Int. Cl.⁴ ............................................. B23D 67/12
[52] U.S. Cl. ................................ 51/205 WG; 76/83; 30/287
[58] Field of Search ............ 51/205 WG, 354; 76/83, 76/88, 82; 30/287, 124; 280/809; 29/78-80

[56] References Cited

U.S. PATENT DOCUMENTS

| | | | |
|---|---|---|---|
| 721,843 | 3/1903 | Stepzinski | 76/83 |
| 3,561,169 | 2/1971 | Pirzek et al. | 76/88 X |
| 3,643,328 | 2/1972 | Wainwright, Jr. | 36/172 |
| 3,875,825 | 4/1975 | Buttafuoco | 51/205 WG |
| 4,060,013 | 11/1977 | Thompson | 76/83 |
| 4,442,636 | 4/1984 | Obland | 51/205 WG |

Primary Examiner—Frederick R. Schmidt
Assistant Examiner—Robert A. Rose
Attorney, Agent, or Firm—Morris A. Case

[57] ABSTRACT

A pair of support members are slideably inserted into a rectangular shaped open ended housing from opposite ends of the housing. Each support member has a downwardly extending projection to form facing cutting surfaces. A resilient member presses the support members toward each other forming a ski sharpener. When the sharpener is placed against and moved along a ski the cutting surfaces sharpen the sides of the ski.

1 Claim, 9 Drawing Figures

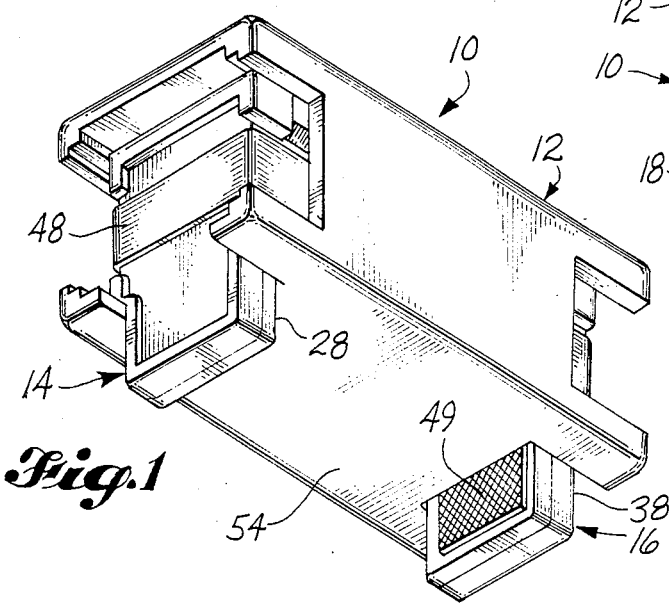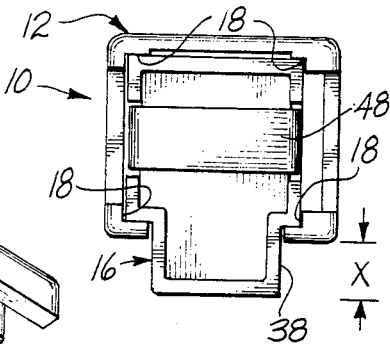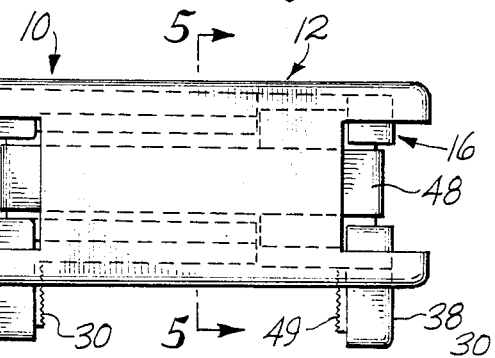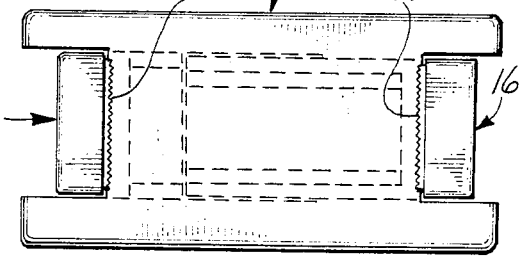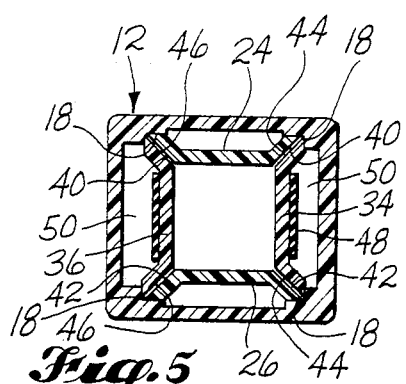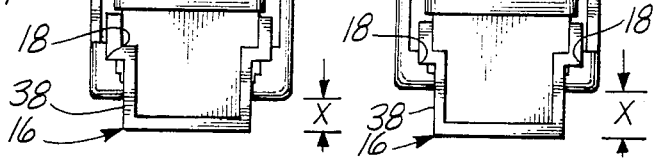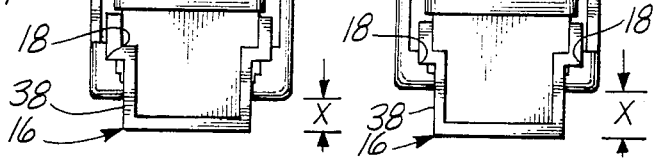

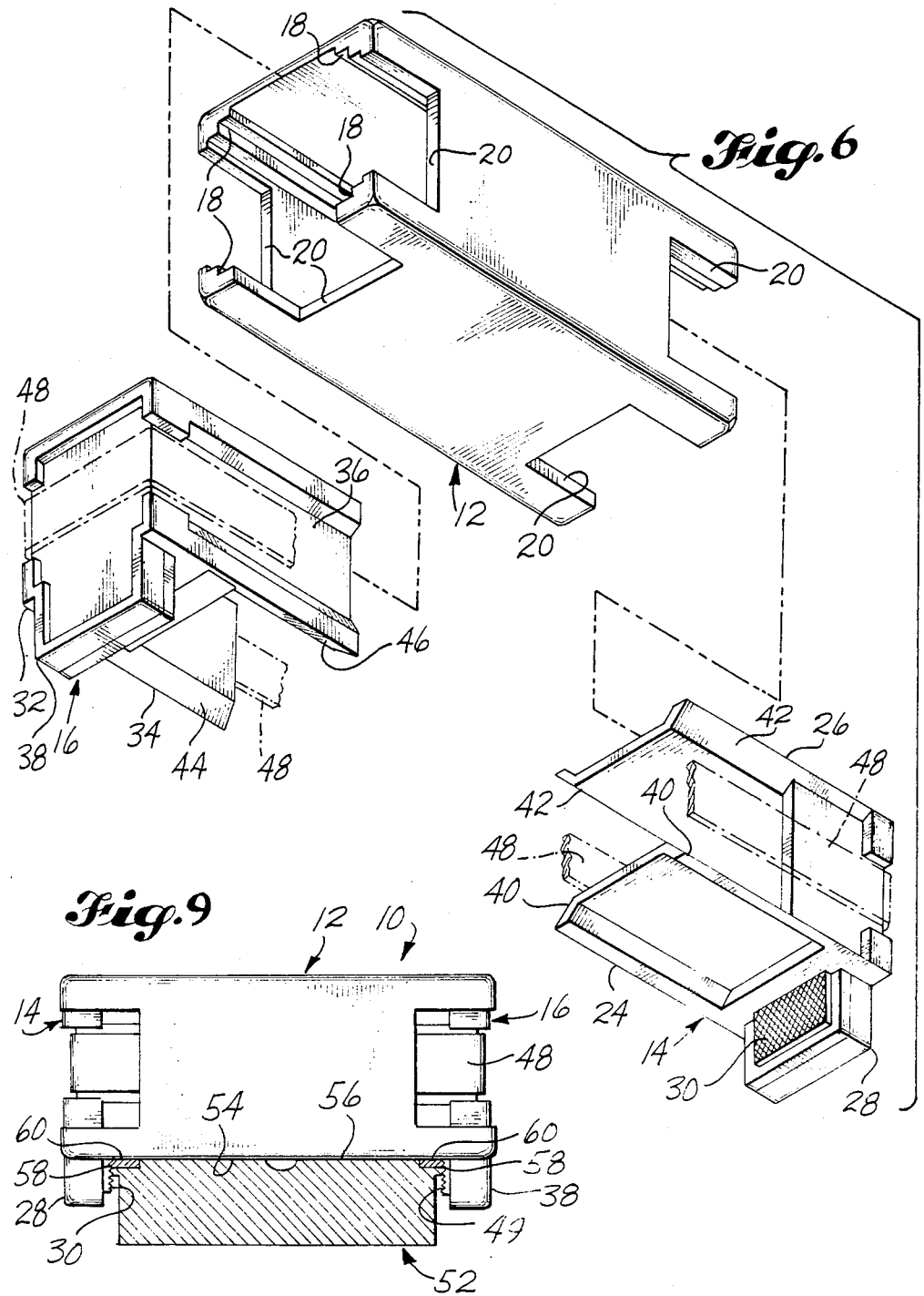

SKI SHARPENING TOOL

BACKGROUND OF THE INVENTION

It is common practice today to provide a biting edge to snow skis by use of a metal strip along each side at the bottom corners. Each strip is flush with the bottom of the ski, but extends slightly out from the sides of the ski. This edge provides a surface to cut into the snow, and adds to the maneuverability. With use these surfaces often become dented and or otherwise dulled and it becomes necessary to sharpen them. It is a simple matter to file flat the bottom surface of the ski, but it becomes much more difficult to accomplish proper sharpening along the sides of the ski. A sharpening device for snow skis was found that assures a uniform angle and a uniform pressure is applied, and it is the subject of this invention.

SUMMARY OF THE INVENTION

A rectangular open ended housing is sized to extend transversely across a snow ski with one side flat against the underside of the ski. A pair of support members, sized to slideably move within the housing from opposite directions are inserted into the housing. Each support member has a cutting surface extending below the housing, to in combination form a pair of facing surfaces to contact the sides of a snow ski. An elastic band resiliently forces the facing cutting surfaces toward each other as the sharpener is moved along the ski.

It is an object of this invention to provide a ski sharpener that can quickly and accurately sharpen the sides of the ski.

It is another object to provide a ski sharpener that can be adjusted to give prolonged life to a cutting surface used in the sharpener.

DESCRIPTION OF THE DRAWINGS

FIG. 1 shows a perspective view of the sharpening tool of this invention.

FIG. 2 shows a side elevational view,

FIG. 3 a bottom view, and

FIG. 4 an end view of the invention of FIG. 1.

FIG. 5 shows a cross sectional view taken along line 5—5 of FIG. 2.

FIG. 6 shows an exploded different perspective view of the sharpening tool of FIG. 1.

FIGS. 7 and 8 each show an end view with movable parts differently arranged to utilize different sections of an abrading surface when using this invention.

FIG. 9, shows a side elevational view as in FIG. 4, but with the sharpening device located on a ski.

DETAILED DESCRIPTION

A ski sharpening device 10, has a housing 12, to slideably accept a pair of movable support members 14 and 16. The housing is preferably rectangular in cross section, is open ended, and has longitudinally extending square interior corners 18. These corners are located to be equidistant from each of the adjacent corners. A number of rectangular shaped recesses 20, are located to extend inward from the end. There are three of these recesses in each end, and they are located to be centered with respect to the interior corners adjacent the recess.

The support members 14 and 16, are inserted into opposite ends of the housing, and are aligned facing each other. The support member 14 has a body section 22, a pair of arms 24 and 26, and a projection 28. The arms extend inward, are spaced apart, are shaped to extend sideways to contact and to slideably move along the corners 18, of the housing. The projection extends outward at 90 degrees from the direction of movement of the support member. A cutting surface such as an abrading material or a file, is attached to the projection to provide an inwardly facing cutting surface 30. The support member 16, likewise has a body section 32, a pair of arms 34 and 36, and a projection 38. The arms of this body section extend inward, are spaced apart, and are shaped to extend vertically to contact and to slideably move along the corners 18, of the housing 12. The inwardly directed arms of the two support members are shaped to permit overlapping of each other and still permit movement. This is accomplished by shaping the arms with tapered edges, as is best shown in FIGS. 5 and 6. See edges 40 for arm 24, edges 42 for arm 26, edges 44 for arm 34, and edges 46 for arm 36. The projection 38 extends outward at 90 degrees from the direction of movement of the support member. A file is secured to the projection to provide a cutting surface 49, that is facing the surface 30.

The two support members are resiliently urged toward each other with a resilient pulling force. This could be a tension spring extending between the two members, however, the use of an elastomeric band 48, is the preferred method. The two support members, and the housing are shaped at 50, to permit the band to encircle the support members without binding.

In operation a snow ski 52, is positioned to permit access to the bottom of the ski, and the bottom surface is sharpened with a file. The ski sharpening tool 10, is then placed over the ski with housing surface 54, flat against the underside 56, of the ski, and cutting surfaces 30 and 49, brought against the sides of the ski and in contact with the sides 58, of metal runners 60. The sharpener is then held against and moved along the length of the ski to cut the side of the metal edges to sharpen the ski. The side 58, of the metal runners or strips are very narrow and only a small part of the length of the cutting surface is in cantact with the edges to be sharpened. Note distance X in FIG. 4, showing the distance from the side of the housing to the end of the projection. The support members may be removed from the housing, rotated either to the right or to the left, and again inserted into the housing to bring a different part of the cutting surface into contact with the metal sides of the ski to be sharpened. FIGS. 7 and 8 each show an end view similar to the view of FIG. 4, but with the support members differently aligned. This permits using three different parts of the cutting surfaces.

I claim:

1. A device for sharpening skis comprising: a rectangular cross sectioned open ended housing having four lengthwise inside corners, a support member movable into one end of the housing and shaped to slideably move in contact with the four inside corners with the member having a projection extending at 90 degrees away from the housing, a second support member movable into a second and opposite end of the housing and shaped to slideably move in contact with the four inside corners with the member having a projection extending at 90 degrees away from the housing to in combination with the first projection form a pair of facing surfaces, means for overlapping the support members, a cutting surface to cover each of the facing surfaces, means for resiliently urging the support members with cutting facing surfaces toward each other to provide a ski sharpening device, the inside corners in the housing each being an equal distance from an adjacent inside corner to permit inserting aligned support members in any one of three positions 90 degrees apart, and a distance defined by a line between adjacent corners and the nearest outer wall of the housing varies in each of the three positions to vary the parts of the projecting surfaces that are used to sharpen the ski.

* * * * *